(12) United States Patent
Abbas

(10) Patent No.: US 11,611,690 B2
(45) Date of Patent: Mar. 21, 2023

(54) METHODS AND APPARATUS FOR REMOTE CAMERA CONTROL WITH INTENTION BASED CONTROLS AND MACHINE LEARNING VISION STATE MANAGEMENT

(71) Applicant: American Well Corporation, Boston, MA (US)

(72) Inventor: Ghafran Abbas, Ashburn, VA (US)

(73) Assignee: American Well Corporation, Boston, MA (US)

( * ) Notice: Subject to any disclaimer, the term of this patent is extended or adjusted under 35 U.S.C. 154(b) by 0 days.

(21) Appl. No.: 16/778,316

(22) Filed: Jan. 31, 2020

(65) Prior Publication Data

US 2020/0169659 A1     May 28, 2020

Related U.S. Application Data

(63) Continuation of application No. PCT/IB2018/056139, filed on Aug. 15, 2018.

(60) Provisional application No. 62/545,582, filed on Aug. 15, 2017.

(51) Int. Cl.
    *H04N 5/232*        (2006.01)

(52) U.S. Cl.
CPC ..... *H04N 5/23203* (2013.01); *H04N 5/23218* (2018.08); *H04N 5/23296* (2013.01); *H04N 5/23299* (2018.08)

(58) Field of Classification Search
CPC ........... H04N 5/23203; H04N 5/23299; H04N 5/23218; H04N 5/23296; H04N 7/147; H04N 7/142; H04N 5/23238; H04N 7/181; H04N 5/23206

See application file for complete search history.

(56) References Cited

U.S. PATENT DOCUMENTS

| | | | |
|---|---|---|---|
| 5,726,713 A | 3/1998 | Panis | |
| 5,729,471 A | 3/1998 | Jain et al. | |
| 6,233,007 B1 | 5/2001 | Carlbom et al. | |
| 7,629,995 B2 * | 12/2009 | Salivar | H04N 5/232 348/143 |

(Continued)

OTHER PUBLICATIONS

International Search Report and Written Opinion issued by the International Searching Authority for Application No. PCT/IB18/56139, dated Dec. 13, 2018, 7 pages.

(Continued)

*Primary Examiner* — Jason A Flohre
(74) *Attorney, Agent, or Firm* — Fish & Richardson P.C.

(57) ABSTRACT

In some embodiments, an apparatus includes a memory and a processor. The processor is configured to receive an intent command from a control device. The processor is configured to identify, based on the intent command, a first portion of an image captured by a first image capture device and to identify, using video analytics, a second portion of the image captured by the first image capture device. The second portion is included in an image captured by a second image capture device at a first time. The processor is configured to calculate an offset between the first portion and the second portion using the image captured by the first image capture device. The processor is configured to send a signal to adjust using the offset the second image capture device to capture an image including the first portion at a second time after the first time.

13 Claims, 6 Drawing Sheets

(56) References Cited

U.S. PATENT DOCUMENTS

| | | | |
|---|---|---|---|
| 9,098,611 B2 | 8/2015 | Pinter et al. | |
| 9,270,941 B1* | 2/2016 | Lavelle | H04N 5/23218 |
| 9,571,789 B2 | 2/2017 | Pinter et al. | |
| 10,805,533 B2* | 10/2020 | Griffis | H04N 5/2259 |
| 2002/0005902 A1 | 1/2002 | Yuen | |
| 2006/0033813 A1* | 2/2006 | Provinsal | H04N 7/181 |
| | | | 348/143 |
| 2006/0222354 A1* | 10/2006 | Mori | G06T 7/73 |
| | | | 396/77 |
| 2007/0109407 A1* | 5/2007 | Thompson | G08B 13/1963 |
| | | | 348/143 |
| 2007/0223808 A1 | 9/2007 | Kerr | |
| 2008/0297587 A1 | 12/2008 | Kurtz | |
| 2010/0245532 A1* | 9/2010 | Kurtz | G06K 9/3216 |
| | | | 348/14.03 |
| 2011/0128385 A1* | 6/2011 | Bedros | H04N 5/23218 |
| | | | 348/164 |
| 2011/0285807 A1 | 11/2011 | Feng | |
| 2012/0197439 A1 | 8/2012 | Wang et al. | |
| 2012/0197464 A1 | 8/2012 | Wang et al. | |
| 2014/0267549 A1 | 9/2014 | Pinter et al. | |
| 2014/0320587 A1 | 10/2014 | Oyman | |
| 2015/0201134 A1* | 7/2015 | Carr | H04N 21/454 |
| | | | 348/143 |
| 2016/0078193 A1 | 3/2016 | Pinter et al. | |
| 2016/0227128 A1 | 8/2016 | Um et al. | |
| 2017/0076438 A1* | 3/2017 | Kottenstette | G06K 9/627 |
| 2017/0085782 A1 | 3/2017 | Oyman et al. | |
| 2017/0155831 A1* | 6/2017 | Jang | H04N 5/23296 |
| 2018/0376074 A1* | 12/2018 | Gumpert | H04N 5/23203 |
| 2019/0164310 A1* | 5/2019 | Noble | G06K 9/3241 |

OTHER PUBLICATIONS

Intouch Health Demo Video, posted Jan. 21, 2015 at https://www.youtube.com/watch?v=GKAPOPO49DQ, 799 pages.

PCT International Preliminary Report on Patentability in International Appln. No. PCT/IB2018/056139, dated Feb. 18, 2020, 5 pages.

* cited by examiner

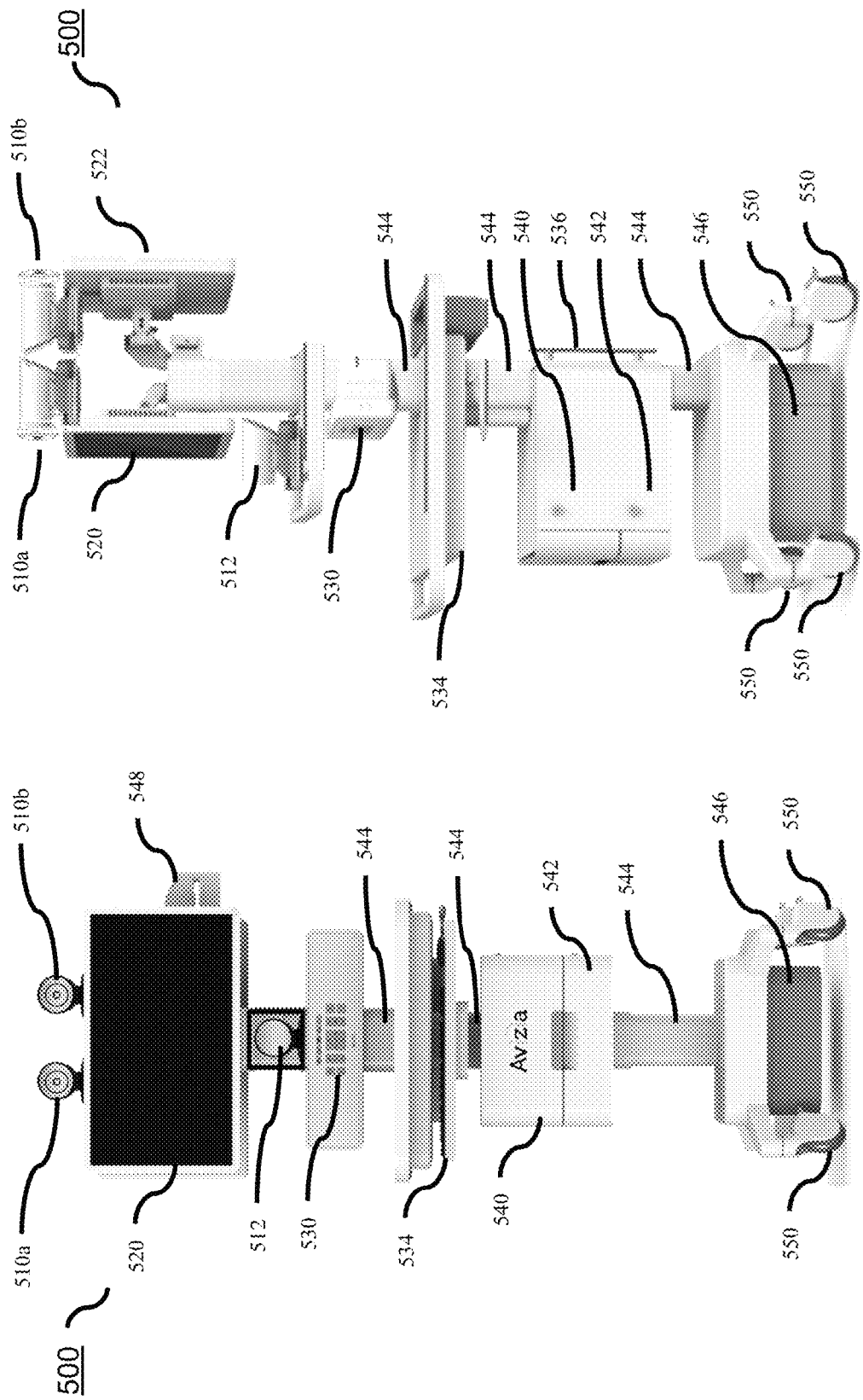

METHODS AND APPARATUS FOR REMOTE CAMERA CONTROL WITH INTENTION BASED CONTROLS AND MACHINE LEARNING VISION STATE MANAGEMENT

CROSS-REFERENCE TO RELATED APPLICATIONS

This application is a continuation of International Application No. PCT/IB2018/056139, filed Aug. 15, 2018, entitled "Methods And Apparatus For Remote Camera Control With Intention Based Controls And Machine Learning Vision State Management," which claims priority to and the benefit of U.S. Provisional Patent Application No. 62/545,582, filed Aug. 15, 2017, entitled "Methods And Apparatus For Remote Camera Control With Intention Based Controls And Machine Learning Vision State Management," each of which is incorporated herein by reference in its entirety.

BACKGROUND

Embodiments described herein relate to methods and apparatus for remote camera control with intention based controls and machine learning vision state management. More particularly, the embodiments described herein relate to devices and methods for controlling using a computer interface with intention based controls a remote camera positioned on a remote system.

With growing development in telecommunication systems, people can more easily connect with others. Some known telecommunication systems allow people from different geographical locations to connect using voice-based telecommunication systems (for example, telephones, cellular phones, mobiles, satellite phones and/or the like). More recently, some known telecommunication systems have been providing video-based telecommunication, which facilitates a user to have image of the other person. Video-based telecommunication can be useful as it reduces long distance travel costs. Further, video-based telecommunication can save time and energy as travelling to different locations can be overwhelming and tiresome.

Some known telecommunication systems have started implementing robots equipped with camera and communication capabilities. Some known telecommunication robots, however, provide a restrictive viewing angle and camera movements with limited degree of freedom. Thus, the image data obtained remains confined to arrangement of the robot and to the position (and/or placement) of the camera attached on the robot.

Thus, a need exists for a camera system that provides image data to a remote station such that a remote user can have an improved view the camera system's surroundings and can control actions of the camera system.

SUMMARY

In some embodiments, an apparatus includes a memory and a processor operatively coupled to the memory. The processor is configured to receive an intent command from a control device operatively coupled to the processor via a network. The processor is configured to identify, based on the intent command, a first portion of an image captured by a first image capture device. The processor is configured to identify, using video analytics, a second portion of the image captured by the first image capture device. The second portion is included in an image captured by a second image capture device at a first time. The processor is configured to calculate an offset between the first portion and the second portion using the image captured by the first image capture device. The processor is configured to send a signal to adjust using the offset the second image capture device to capture an image including the first portion at a second time after the first time.

BRIEF DESCRIPTION OF THE DRAWINGS

FIG. 5a is a front view of a compute system, according to an embodiment.

FIG. 5b is a side view of the compute system shown in FIG. 5a.

DETAILED DESCRIPTION

In some embodiments, an apparatus includes a memory and a processor operatively coupled to the memory. The processor is configured to receive an intent command from a control device operatively coupled to the processor via a network. The processor is configured to identify, based on the intent command, a first portion of an image captured by a first image capture device. The processor is configured to identify, using video analytics, a second portion of the image captured by the first image capture device. The second portion is included in an image captured by a second image capture device at a first time. The processor is configured to calculate an offset between the first portion and the second portion using the image captured by the first image capture device. The processor is configured to send a signal to adjust using the offset the second image capture device to capture an image including the first portion at a second time after the first time.

In some embodiments, a system includes a control device and a compute system connected through a communication network. The control device and the compute system can include an acoustic device and an image-capture device as input/output devices (I/O devices) (for example, camera(s), speaker(s), and/or microphone(s)). The compute system is configured to transmit a video stream to the control device including a 360 degree surrounding image captured using an omnidirectional camera and another image captured using a secondary camera (for example, pan-tilt-zoom (PTZ) camera). The image captured by the secondary camera is a portion of the 360 degree surrounding image. A user operating the control device can view the transmitted 360 degree surrounding view and can control at least some of the functionality of the secondary camera on the compute system. For example, the user can select and view a certain portion of the 360 degree surrounding image and control the image captured by the secondary camera using panning, tilting and/or zooming. In other instances, the user can control the locomotion of the compute system.

As used in this specification, the singular forms "a," "an" and "the" include plural referents unless the context clearly dictates otherwise. Thus, for example, the term "a compute system" is intended to mean a single compute system or a combination of compute systems.

Figure 1:
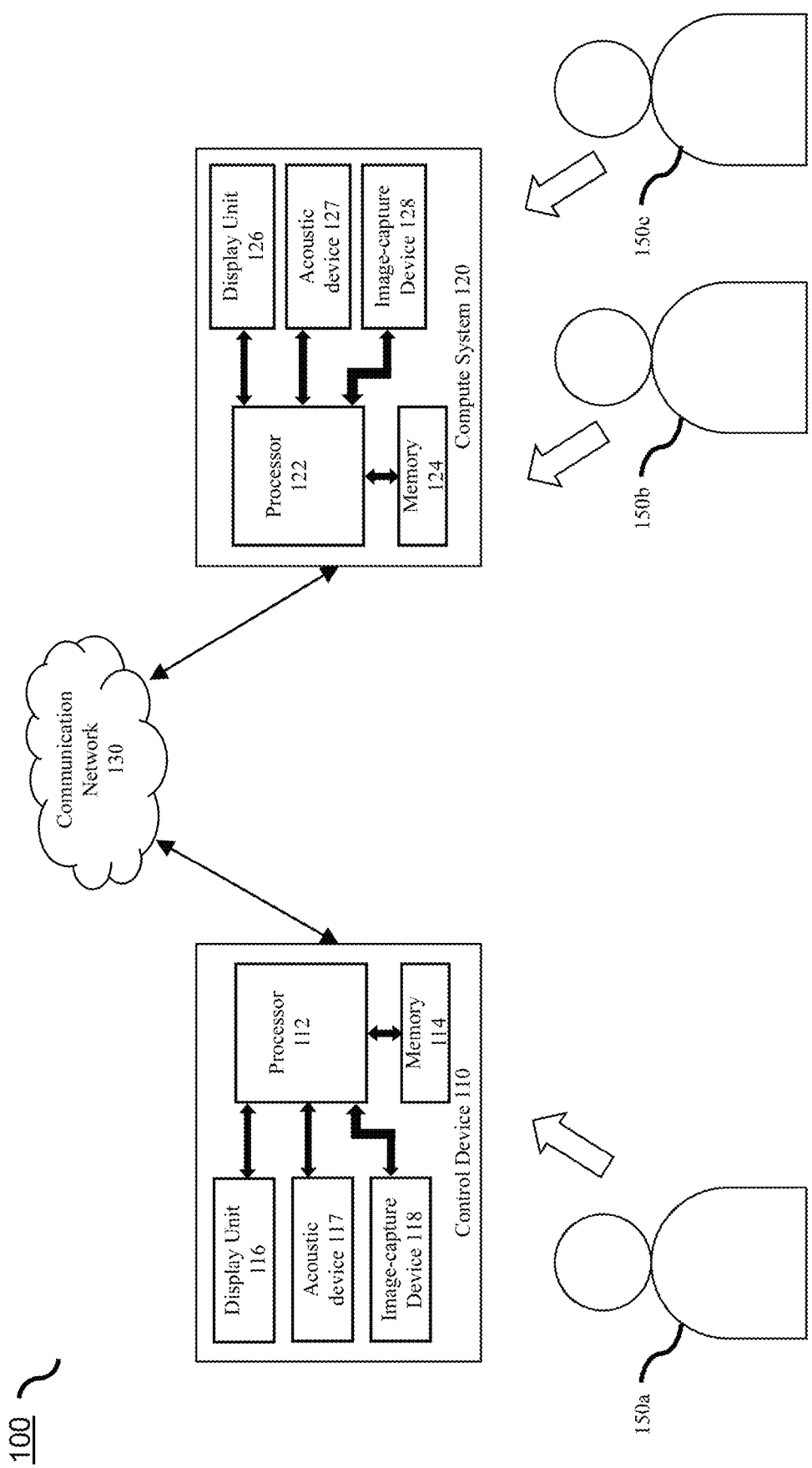
FIG. 1 is an overview of a system for remote camera control with intention based controls and machine learning vision state management, according to an embodiment.

FIG. 1 is an overview of a system 100 for remote camera control with intention based controls and machine learning vision state management, according to an embodiment. The system 100 includes a control device 110 and a compute system 120 operatively coupled to the control device 110 through a communication network 130. The control device 110 can be operated and/or monitored by a user 150a and in some instances, the compute system 120 can perform monitoring of another user(s) 150b and/or 150c via the communication network 130.

The control device 110 and the compute system 120 are operatively connected via the communication network 130. The communication network 130 can be any suitable network or combination of networks. For example, in some embodiments, the network 116 can be a local area network (LAN), a wide area network (WAN), a metropolitan area network (MAN), a worldwide interoperability for microwave access network (WiMAX®), an intranet, the Internet, an optical fiber (or fiber optic)-based network, a virtual network, and/or any combination thereof. Moreover, at least a portion of the communication network 116 can be implemented as a wired network and/or a wireless network. For example, in some embodiments, the compute system 120 can be in communication with the communication network 130 via a wireless access point (for example, a Wi-Fi, local wireless intranet and/or the like) (not shown in FIG. 1) that is operably coupled to and/or is a part of the communication network 130. The control device 120 can similarly be operably coupled to the communication network 130 via a wired and/or wireless connection. The communication network 130 can provide for the transmission (and/or reception) of data communication signal(s), for example, audio signal(s), video signal(s), data signals(s) and/or the like. The functions and/or details of operation associated with the communication network 130 are further disclosed herein.

The control device 110 can be a hardware device supporting multimedia capability and/or supporting connection to the communication network 130. For example, the control device 110 can be a device such as a computer, a laptop, a mobile phone, a personal digital assistant (PDA), a tablet, a portable handheld device, and/or the like. The control device includes a processor 112, a memory 114, a display unit 116, an acoustic device 117, and an image-capture device 118.

The memory 114 of the control device 110 can be, for example, a random access memory (RAM), a memory buffer, a hard drive, a read-only memory (ROM), an erasable programmable read-only memory (EPROM), and/or the like. In some implementation, the memory 114 may or may not be a portable memory (for example, a flash drive, a portable hard disk, and/or the like) that can be operatively coupled to the processor 112. The memory 114 can store, for example, one or more software modules and/or code that can include instructions to cause the processor 112 to perform one or more processes, functions, and/or the like. For example, in some instances, the memory 114 can include a software module and/or program code that can include instructions to cause the processor 112 to process at least one data communication signal (for example, a 360 degree video communication signal) sent from the compute system 120 through the communication network 130. The memory 114 can further include instructions to cause the processor 112 to obtain, send and/or receive one or more data communication signals to operatively coupled devices, for example, a display unit 116, an acoustic device 117, a image-capture device 118 and/or the like. In some instances, the memory 114 can also store a software program and/or predefined policies that can be implemented (e.g., by the processor 112) for ensuring security during the communication process between the control device 110 and the compute system 120 (for example, the processor 114 can implement encryption of data communication signals).

The processor 112 in the control device 110 can be a hardware based integrated circuit (IC) and/or any suitable processing device configured to run and/or execute a set of instructions or code. For example, the processor 112 can be a general purpose processor, a central processing unit (CPU), an accelerated processing unit (APU), an application specific integrated circuit (ASIC), a field programmable gate array (FPGA), and/or the like. The processor 112 is operatively coupled to the memory 114 through a system bus (for example, address bus, data bus and/or control bus). Further, the processor 112 can be operatively coupled to the display unit 116, the acoustic device 117 and/or the image-capture device 118. The processor 112 can be connected to at least one compute system 120 using the communication network 130 for performing data communication. As such, the memory 114 can store instructions to cause the processor 112 to execute the instructions and/or other modules, processes, and/or functions associated with managing data communication signals such as, for example, to receive audio-video based data communication signal(s) from compute system 120, to display the contents of the video signal on to a display unit 116, to transmit and/or receive data communication signal(s) over the communication network 130, to display user interface on the display unit 116. The function and operation of the processor 112 is described in further detail herein.

In some instances, the processor 112 can be operatively coupled to input/output devices such as, for example, a touch screen, a microphone, an acoustic speaker, and/or a camera. Further, the processor 112 can be configured to send and/or receive one or more data communication signals associated with a display unit 116. The data communication signal(s) from the display unit 116 can control at least some functionality of the devices connected to the compute system 120. For example, the processor can display the contents of the video signal on the display 116 and also obtain the input signals from a touch screen, which can be the same display 116). In other implementations, the processor 112 can be operatively coupled to any other suitable input/output devices such as, for example, a keyboard, a mouse, a trackpad, a haptic output device and/or the like.

The control device 110 includes a display unit 116 capable of displaying a video or an image content onto a digital screen. The display unit 116 can be for example, a cathode ray tube (CRT) display, a liquid crystal display (LCD), a light emitting diode (LED) display and/or the like. In some instances, the display unit 116 can be a display projector unit capable of projecting images on different types of surface for example, plastic, glass, paper and/or the like. The display unit 116 can be a touchscreen unit providing the user with interactive experience. Moreover, the processor 112 can be configured to receive signals from display unit 116 indicative and/or in response to a user's interaction with the image display. For example, in instances in which the display unit 116 is a touchscreen, the display unit 116 can receive signals indicative of haptic data based on the user's touching of the touchscreen. Such haptic data can include, for example, location, direction of motion, velocity, acceleration, and force of a user's touching of the touchscreen. In other instances, the processor 112 can be configured to obtain input from other types of input devices, for example, mouse, keyboard, trackpad and/or the like.

The control device 110 includes an acoustic device 117 and a image-capture device 118. The acoustic device 117 can be used for conversion of sound energy into electrical signal(s) and vice versa. For the former conversion, a microphone is used (not shown in FIG. 1) and/or any other transducer that converts sound energy into an electrical signal(s). The microphone can be of different types such as condenser based, dynamic, ribbon, carbon, piezoelectric, fiber-optic, silicon microphone and/or the like. For the latter conversion, a speaker and/or any other device that converts electrical signal(s) into sound can be used.

The image-capture device 118 includes for example, a camera (not shown in FIG. 1) and/or any other optical transducer for converting light into electrical signal(s). The image-capture device 118 can be used for recording and/or capturing images and/or videos, which may be stored locally in the memory 114, transmitted to the compute system 120, and/or both. In some instances, the image-capture device 118 can include an arrangement of multiple cameras. The arrangement of multiple cameras can further include different camera types based on camera functionality. The functionality and the operations for the acoustic device 117 and the image-capture device 118 are described in further detail herein.

The compute system 120 can be a hardware device supporting multimedia capability and/or supporting connection to the communication network 130. The compute system 120 includes a processor 122, a memory 124, a display unit 126, an acoustic device 127, and a image-capture device 128. In some implementations, the compute system 120 can be arranged as a portable computer system with wheels attached the base further described in detail herein.

The memory 124 of the compute system 120 can be structurally and functionality similar to the memory 114 as described above. The processor 122 of the compute system 120 can be a hardware based integrated circuit (IC) and/or any suitable processing device configured to run and/or execute a set of instructions or code. For example, the processor 122 can be a general purpose processor, a central processing unit (CPU), an accelerated processing unit (APU), an application specific integrated circuit (ASIC), a field programmable gate array (FPGA), and/or the like. The processor 122 is operatively coupled to the memory 124 through a system bus (for example, address bus, data bus and/or control bus). Further, the processor 122 can be operatively coupled to the display unit 126, the acoustic device 127 and/or the image-capture device 128.

The processor 122 can be connected to at least one control device 110 using the communication network 130 for performing data communication. As such, the memory 124 can store instructions to cause the processor 122 to execute the instructions and/or other modules, processes, and/or functions associated with managing data communication signals such as, for example, to receive audio and/or video based data communication signal(s) from control device 110, to display the contents of the video signal on to a display unit 126, to transmit and/or receive data communication signal(s) over the communication network 130, and/or to display a user interface on the display unit 126. The function and operation of the processor 122 is described in further detail herein.

The compute system 120 includes a display unit 126 capable of displaying a video or an image content onto a digital screen. The display unit 126 can be for example, a cathode ray tube (CRT) display, a liquid crystal display (LCD), a light emitting diode (LED) display and/or the like. Further, the display unit 126 can be a touchscreen unit providing the user with an interactive experience for example, the user 150b and/or 150c can select some options displayed on the display unit 126. The processor 122 can be configured to receive signals from display unit 126 indicative and/or in response to a user's interaction with the image display. For example, in instances in which the display unit 126 is a touchscreen, the display unit 126 can receive signals indicative of haptic data based on the user's touching of the touchscreen. Such haptic data can include, for example, location, direction of motion, velocity, acceleration, and force of a user's touching of the touchscreen.

In some other implementation, the display unit 126 can be a display projector unit capable of projecting images on different types of surface for example, plastic, glass, paper and/or the like. The user (150b, 150c) can interact with the compute system 120 using different input/output devices (I/O devices) for example, gesture-based control, keyboard, mouse and/or the like.

The compute system 120 includes an acoustic device 127 and an image-capture device 128. The acoustic device 127 can be used for conversion of sound energy into electrical signal(s) and vice versa. For the former conversion, a microphone is used (not shown in FIG. 1) and/or any other transducer that converts sound energy into an electrical signal(s). The microphone can be of different types such as condenser based, dynamic, ribbon, carbon, piezoelectric, fiber-optic, silicon microphone and/or the like. For the latter conversion, a speaker and/or any other device that converts electrical signal(s) into sound can be used.

The image-capture device 128 includes for example, a camera (not shown in FIG. 1) and/or any other optical transducer for converting light into electrical signal(s). The image-capture device 128 can be used for recording and/or capturing images and/or videos, which may be stored locally in the memory 124, transmitted to the control device 110, and/or both. In some instances, the image-capture device 128 can include an arrangement of multiple cameras. The arrangement of multiple cameras can further include different camera types based on camera functionality. For example, the arrangement of multiple cameras can include at least 2 wide-angle lens camera (such as fish-eye lens camera) for capturing a 360 degree view around the compute system 120 and another regular-lens camera for performing pan-tilt-zoom (PTZ) function. The functionality and the operations for the acoustic devices 127 and the image-capture device 128 are described in further detail herein. Moreover, while described throughout as being a 360 degree view from wide-angle lens cameras and an image from a PTZ camera, in other implementations any other suitable cameras can be used to capture the images.

In some instances, the system 100 can be used in a medical setting, for example, healthcare facilities, hospitals, nursing home and/or the like. In such medical setting, the user (150a, 150b, 150c) can include remote specialists and/or telemedicine providers, for example, primary care physicians, cardiologists, neurologists, psychiatrists, dermatologists, pediatricians, hepatologists, Oncologists, rehab therapists, diabetes educators and/or the like. In other instances, the operators can also include tele-first responders, surgeons and/or other medical professionals. Further, the user can include patients, medical staff and/or other healthcare professionals.

In other instances, the system 100 can be used in other settings, for example, mining, business video conferencing, hazmat areas, rescue operations, space exploration, remote surveillance and/or other suitable applications. In such settings, the user (150a, 150b, and 150c) can include different professionals of their respective field, for example, miners, business executives, trained hazmat-area operators, first responders, rescue workers, cosmonaut, scientists and/or any other person capable to operate the system 100.

In use, the user 150a operates the control device 110 to establish a connection with the compute system 120 via the communication network 130. The compute system 120 is configured to capture video of the surrounding area using the image-capture device 128 and audio is captured using the acoustic device 127. The processor 122 can receive and/or process the captured video and/or audio from the image-capture device 128 and acoustic device 127, respectively. The processor 122 can then transmit the video and/or audio as data communication signal(s) to the control device 110 using the communication network 130. Furthermore, the processor 122 is configured to receive and/or process data communication signal(s) sent from the control device 110. The processor 122 displays the received video on the display unit 126 (for example, touch screen) and plays the audio using the acoustic device 127 (for example, acoustic loudspeaker and/or the like).

On the control device 110, the processor 112 is configured to receive and/or process the data communication signal(s) from the compute system 120. The processor 112 provides instructions to display the received video on the display unit 116 and output the audio using the acoustic device 117 (for example, acoustic loudspeaker and/or the like). The processor 112 can also receive and/or process captured video and/or audio from the image-capture device 118 and acoustic device 117, respectively. The processor 112 can then transmit the video and/or audio as data communication signal(s) to the compute system 120 using the communication network 130. As such, a video and/or audio conference can be initiated and performed between the control device 110 and the compute system 120.

In some instances, the user 150a can operate the control device 110 to control the image-capture device 128 (for example, wide-angle lens camera and/or PTZ camera) present on the compute system 120. More specifically, in some instances the user 150a can indicate an intent to the control device 110. An indication of intent can include, for example, selecting a portion of an image from the 360 degree surrounding image to be viewed with the PTZ camera, selecting options from the user interface, controlling the locomotion of the compute system 120 and/or other features as described herein. In some instances, the user interface can provide options for example, identifying objects in the 360 degree surrounding visual (for example, person, furniture, and/or the like), following (and/or monitoring) a person (for example, following a patient, monitoring patient movements and/or the like), obtaining measurement values from physiological measuring devices, navigating the compute system 120 to a particular room and/or other options as described herein.

The indication of intent can include at least some defined set of instruction(s) (also referred to as intent commands) that can be generated (and/or identified) by the processor 112 after the user 150a indicates an intent. The intent commands can include instructions in processor-implementable language for the processor 122 to implement the required steps for achieving and/or executing the indicated intent. For example, the intent command can include metadata (and/or pixel data) of the portion of an image selected from the 360 degree surrounding image, instructions to execute at least one option from the user interface and/or the like.

The processor 112 of the control device 110 transmits the intent commands associated with the indicated intent to the compute system 120. In some instances, the intent commands can enable the user 150a to control at least some features of the image-capture device 128 on the compute system 120.

The processor 122 is configured to receive and process the intent commands to achieve and/or execute the intent. Results from the intent (e.g., images associated with the intent) can be sent back to the control device 110 via communication network 130.

As an example, one intent can be to capture a portion of an image from the 360 degree surrounding image with the PTZ camera. The selection of the portion can be done using different selection methods for example, pinch operation, drawing a circle around an object displayed in 360 degree surrounding image, double tapping on the object displayed in 360 degree surrounding image, selecting the portion with a cursor (e.g., using a mouse) in the 360 degree surrounding image, and/or the like. The processor 112 generates associated intent commands based on the selection to be transmitted to the processor 122. The intent commands can involve pixel data details of the selected object or portion of the image. The processor 122 can then use analytics to identify objects, edges, contours, color, white balance and/or the like in the selected portion of the image. In some implementations, for example, the processor can implement a machine learning model (e.g., a convolution neural network (CNN)) to identify the selected object in the 360 degree surrounding image. Specifically, the processor can use image and/or pixel data from the intent commands as input to the machine learning model to recognize and/or identify edges, objects, contours, colors, white balance and/or the like in the image and/or pixel data. Using the machine learning model, the processor can locate a substantially similar view in the 360 degree surrounding image. The processor is then configured to identify the location (for example, X-coordinates/Y-coordinates and/or pixel data position of the object or image portion) of the identified object in the 360 degree surrounding image.

Continuing with the example, the processor 122 is configured to determine the location and/or position of the PTZ camera by determining (and/or identifying) an object and/or scene in the image currently being captured by the PTZ camera. This can be done using the machine learning model (as described above). Specifically, the image currently being captured by the PTZ camera (or associated pixel data) can be an input to the machine learning model to identify edges, objects, contours, colors, white balance and/or the like in the image and/or pixel data. The processor 122 is then configured to perform a search for the identified object and/or scene in the 360 degree surrounding image using the machine learning model as described above (e.g., searching the 360 degree surrounding image for the edges, objects, contours, colors, white balance and/or the like identified as being in the image currently being captured by the PTZ camera). The processor 122 is further configured to determine the location (for example, X-coordinates/Y-coordinates and/or pixel data position of the object and/or scene) of the identified object and/or scene in the 360 degree surrounding image.

The processor 122 then determines the difference between the location the PTZ camera is currently capturing and the location from the intent commands. The processor 122 is configured to move and/or reposition the PTZ camera to the location from the intent commands such that the PTZ camera captures the selected object and/or scene. The processor 122 is further configured to perform operations such as panning, tilting and/or zooming for additional adjustments (e.g., based on user input at the control device 110).

Using video analytics and/or object recognition to locate objects and/or scenes from the 360 degree surrounding image using the PTZ camera reduces and/or eliminates the alignment needed between the wide angle cameras and the PTZ camera. Specifically, because recognizing objects and/or scenes is not based on the relative position of the cameras to each other, if the position of the cameras changes (e.g., the cameras are repositioned, bumped, etc.), the PTZ camera will still be able to locate the object and/or scene that is part of the intent.

As another example, the user 150a can indicate an intent to locate and/or view a person in the surrounding area of the compute system 120. For example, the user 150a can indicate an intent to identify a patient in the room in which the compute system 120 is located. The processor 112 can generate intent commands that can be transmitted to the processor 122 of the compute system 120. The processor 122 can then be configured to implement object and/or scene recognition (e.g., based on a machine learning model) that recognizes the patient based on the color, shape, size, and/or the like of the patient's gown. In some instances, for example, the machine learning model (e.g., a convolution neural network) can be trained using multiple datasets to identify different types of objects using different collections of images for recognizing an object associated with an intent using object recognition and/or tracking in the images (for example, identifying objects on the basis of edges, contours, color, white balance and/or other distinguishing parameters in an image). As such, in the current example, the machine learning model can be trained to recognize a person's face, a patient's gown and/or the like.

In some instances, at least some training procedures containing training data (patterns and/or objects) are executed on the machine learning model. The training data can include a set of training examples where each example can be a pair consisting of an input object and a desired output value. The machine learning model analyzes the training data and produces an inferred function that can be used for identifying new examples. For example, the machine learning model can be trained using a dataset of images containing different positions (and/or angles) of objects and the corresponding identification name for the object (for example, the objects can be gowns, bed, chairs, other still objects in the surrounding and/or the like). By using images representing objects at different positions, the machine learning model can better identify that object even if the position of the object changes. Continuing with the current example, if the patient moves around, the machine learning model will still be able to identify the patient based on the gown (and being trained on multiple positions of the gown). In still other instances, unsupervised and/or deep learning can be used to train the machine learning model.

The processor is then configured to identify the location of the patient wearing the gown (for example, X-coordinates/Y-coordinates and/or pixel data position of the object) in the 360 degree surrounding image. The processor 122 is configured to determine the current view of the PTZ camera and the difference between the current view of the PTZ camera and patient wearing the gown using the process as described above. The processor 122 can move and/or adjust the PTZ camera to focus on the patient wearing the gown and can transmit the image from the PTZ camera to the control device 110.

In some instances, the user 150a can also indicate an intent for the compute system 120 to follow (and/or monitor) patient movements and/or other features as described herein. Specifically, if the patient is walking around, the intent can be to ensure that the PTZ camera tracks the patient's movement. As such, the method to locate the difference in the location of the patient and the view of the PTZ camera can be substantially continuously performed (e.g., a number of times per time period) such that the PTZ camera can follow the movement of the patient and the images of the patient can be substantially continuously transmitted to the control device 110.

In yet another instances, the user 150a can indicate an intent to view an object within an area in which the compute system 120 is located. For example, the user 150a can provide an intent to control device 110 to obtain a reading from a medical instrument within the vicinity of the compute system 120. The processor 112 can generate intent commands that can be transmitted to the processor 122 of the compute system 120. The processor 122 can then be configured to implement object and/or scene recognition (e.g., using a machine learning model as described above) that finds (and/or locates) a medical instrument using (for example, in some instances, the medical measuring instruments can be identified using a unique color markers/stickers on the measuring instruments). In such instances, the machine learning model can be trained to recognize and/or identify a location of the medical instrument in the 360 degree image.

The processor 122 is configured to determine the view of the PTZ camera and the difference between the PTZ camera view and the identified medical instrument, using the methods described above. The processor 122 then operates the PTZ camera to zoom into the display screen of the medical instrument to capture an image of the readings displayed by the medical instrument. Such an image can be provided to the control device 110.

In some instances, the machine learning model (e.g., a convolutional neural network) can be trained to locate any suitable object and/or type of object in the 360 degree view. This allows the machine learning model to identify different types of objects using different collections of images for recognizing an object associated with an intent using object recognition and/or tracking in the images (for example, identifying objects on the basis of edges, contours, color, white balance and/or other distinguishing parameters in an image.

In some instances, the object identified in the intent by the processor 122 can include but is not limited to, for example, a patient and/or a healthcare person's apron and/or hospital gown, different furniture in the vicinity, doors and/or windows, different medical devices present in the vicinity (e.g., electrocardiograph, pulse oximetry, blood-parameters monitoring device, urine analysis device, spirometer, health scale & Body Mass Index measuring instrument, defibrillator, and/or other medical instruments capable of measuring physiological parameters).

In some instances, the machine learning model and/or object recognition process mitigates the need for arranging (and/or aligning) of multiple cameras images and/or video. The wide angle cameras, which are arranged to capture a 360 degree surrounding image can be rotated to a new position from a previous position. The new position of the wide angle cameras can render the 360 degree surrounding image, which is at least similar to the 360 degree surrounding image rendered from the previous position. The new position of the wide angle cameras can include changing the distance between at least two wide angle cameras. For example, moving the wide angle cameras away from each other on the horizontal axis and/or plane, bringing the wide angle cameras close to each other on the horizontal axis and/or plane, varying the distance between the wide angle cameras. The complete 360 degree surrounding view can be viewed on display unit 116.

In still other instances, an intent can be any suitable instruction provided by the user 150a to the control device 110 to control an operation on the compute system 120. For example, an intent can also include identifying a location of the compute system 120 (e.g., a room number based on sign or code such as a QR or other barcode), finding a specific object in the presence of the compute system 120, tracking and/or identifying motion (e.g., as a security camera and/or to identify when a patient wakes-up and/or moves), and/or the like.

In some instances, the processor 112 can display a user interface (UI) on the display unit 116 for interacting with the compute system 110. This can allow the user 150a to send commands to remotely control the compute system 120. For example, some features of the user interface allows the user 150a to control the PTZ functions of the image-capture device 128 (such as PTZ camera), move the control device 120 and/or perform other functions related to video-conferencing.

Figure 2:
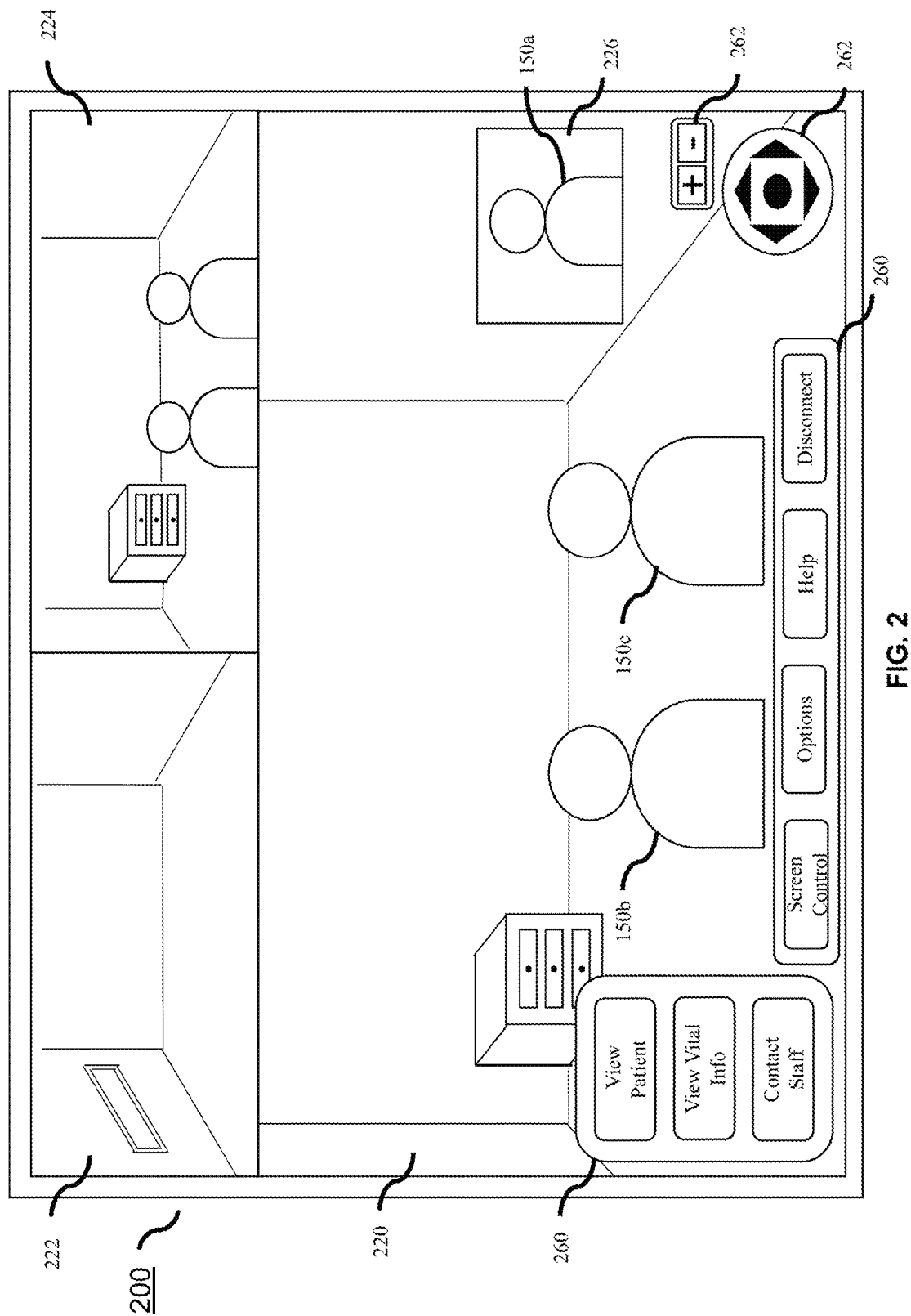
FIG. 2 is an example illustration of a computer interface displayed on a control device, according to an embodiment.

FIG. 2 is an example illustrating a user interface 200 displayed on a control device, according to an embodiment. For example, the user interface 200 can be displayed on the display unit 116 of the control device 110. The user interface 200 includes at least a portion of the screen 220 displaying an image from an image-capture device 128 of compute system 120 (for example, PTZ camera), at least two other portions of screen (222, 224) displaying images from at least two other image-capture devices 128 of compute system 120 (for example, wide-angle cameras, fish-eye lens cameras, 360 degree camera, omnidirectional camera and/or the like). The portions of the screen (222, 224) can be considered to display an image of every direction recorded at the same time, shot using for example, an omnidirectional camera and/or an arrangement of multiple cameras.

In some instances, the portions of the screen (222, 224) is relatively smaller as compared to the portion of the screen 220. Furthermore, the image displayed on the portion of the screen 220 is a part of the image displayed in the portions of the screen (222, 224). In other words, the image displayed on the portion of the screen 220 can be an enlarged (and/or zoomed) image, which is a part of the image displayed by the portions of the screen (222, 224). The image for the portion of the screen 220 and the image for the portions of the screen (222, 224) can be captured using different image-capturing devices 118. For example, a regular lens camera (hereafter referred to as 'PTZ camera') can capture the enlarged (and/or zoomed) image and fish-eye lens cameras can capture the 360 degree surrounding image.

The PTZ camera and the fish-eye lens cameras can have an arrangement (or set-up) such that the fish-eye lens cameras capture a 360 degree image and/or the PTZ camera can access the regions in the covered 360 degree image. Moreover, for capturing augmented image, the PTZ camera and/or the fish-eye lens camera can have at least three-degrees of freedom and may or may not have motor-controlled motion.

The computer interface 200 includes user interface controls 260 to allow a user to view information, control the control device (e.g., control device 110 of FIG. 1), provide commands to the compute system (e.g., compute system 120 of FIG. 1) and/or the like. For example, using a medical application as an example, the user can view patient details, view vital information of the patient and/or contact a medical professional associated with the patient. In some other instances, the user interface controls can provide screen control to, for example, change the brightness, contrast, sharpness and/or the like. The user interface controls can provide call related controls to, for example, connect/disconnect a call to a patient, start/stop a conference call, switch between a voice/video call, record an on-going call, share their screen and/or the like. The computer interface 200 can include camera control interface 262 for controlling at least some features of the image-capture device 128. For example, the camera control interface 262 can provide control for panning, tilting and zooming for a PTZ camera operatively coupled to compute system 120.

The computer interface 200 can provide the video transmitted to the compute system 120 in a portion of screen 226. For example, the user 150a can have an image of himself/herself while engaging in communication with the users 150b and 150c.

In use, the computer interface 200 is displayed on screen on the display unit 116 of the control device 110. The portions of the screen (222, 224) displaying the video from image-capture devices 128 (for example, fish-eye lens camera) of compute system 120 provides user 150a with a 360 degree view. The user 150a can provide an intent. The intent is identified by the processor 112, which sends intent commands to the processor 122 for further processing, as described above.

Figure 3:
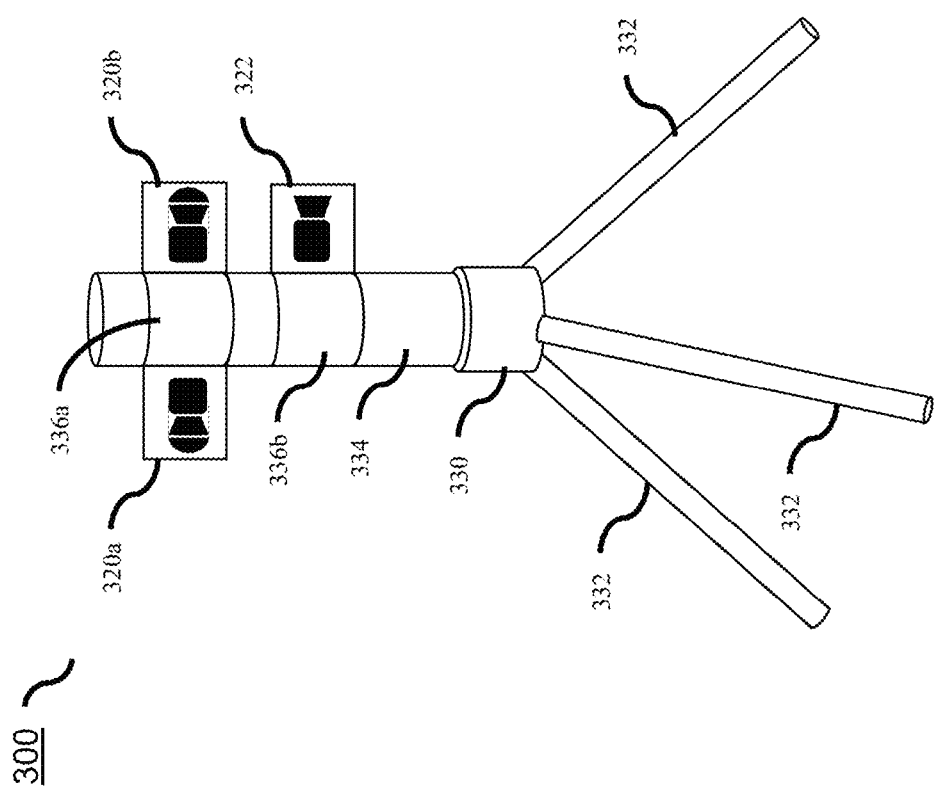
FIG. 3 is an example of a camera arrangement for a compute system, according to an embodiment.

FIG. 3 is an example of a camera arrangement 300 for a compute system 120, according to an embodiment. The camera arrangement can be considered to be a part of the image-capture device 128. The camera arrangement 300 can be classified into two categories, namely, cameras and support structure. The cameras in the camera arrangement includes wide-angle lens cameras 320a and 320b and PTZ camera 322. The supporting structure includes chassis 330, supporting legs 332 and rotatable motor-controlled mounts 336a and 336b.

In some instances, the camera arrangement 300 can include an in-built processing unit containing a graphic processor, communication device and battery (not shown in FIG. 3). In another instances, the camera arrangement can include a microphone and acoustic speaker (not shown in FIG. 3).

In use, the wide-angle lens cameras 320a and 320b and the PTZ camera 322 can have an arrangement (or set-up) such that both the wide-angle lens cameras together cover complete 360 degree image. For example, two fish-eye lens cameras each covering 180 degree image (320a and 320b) are arranged diametrically opposite to each other to together cover 360 degree image. Further, the PTZ camera can access the regions in the covered 360 degree image. The PTZ camera 322 can rotate using the rotatable motor-controlled mount 336b to capture the intent from the covered 360 degree image. In some instances, the PTZ camera 322 can be operated for finer adjustment. For example, the PTZ camera 322 can be panned, tilted and/or zoomed for capturing the selected intent. In other instances, the PTZ camera 322 can have at least three degrees of freedom for capturing the selected intent. In some instances, a processor (e.g., processor 122 of FIG. 1) controls the rotatable motor-controlled mount 336*b* to adjust the position of the PTZ camera 322.

In other instances, the images from the three cameras are stitched together to form a single video stream one with a 360 degree panoramic view combined with PTZ camera view. The 360 degree panoramic view can be displayed as a map view of the surrounding area.

Figure 4:
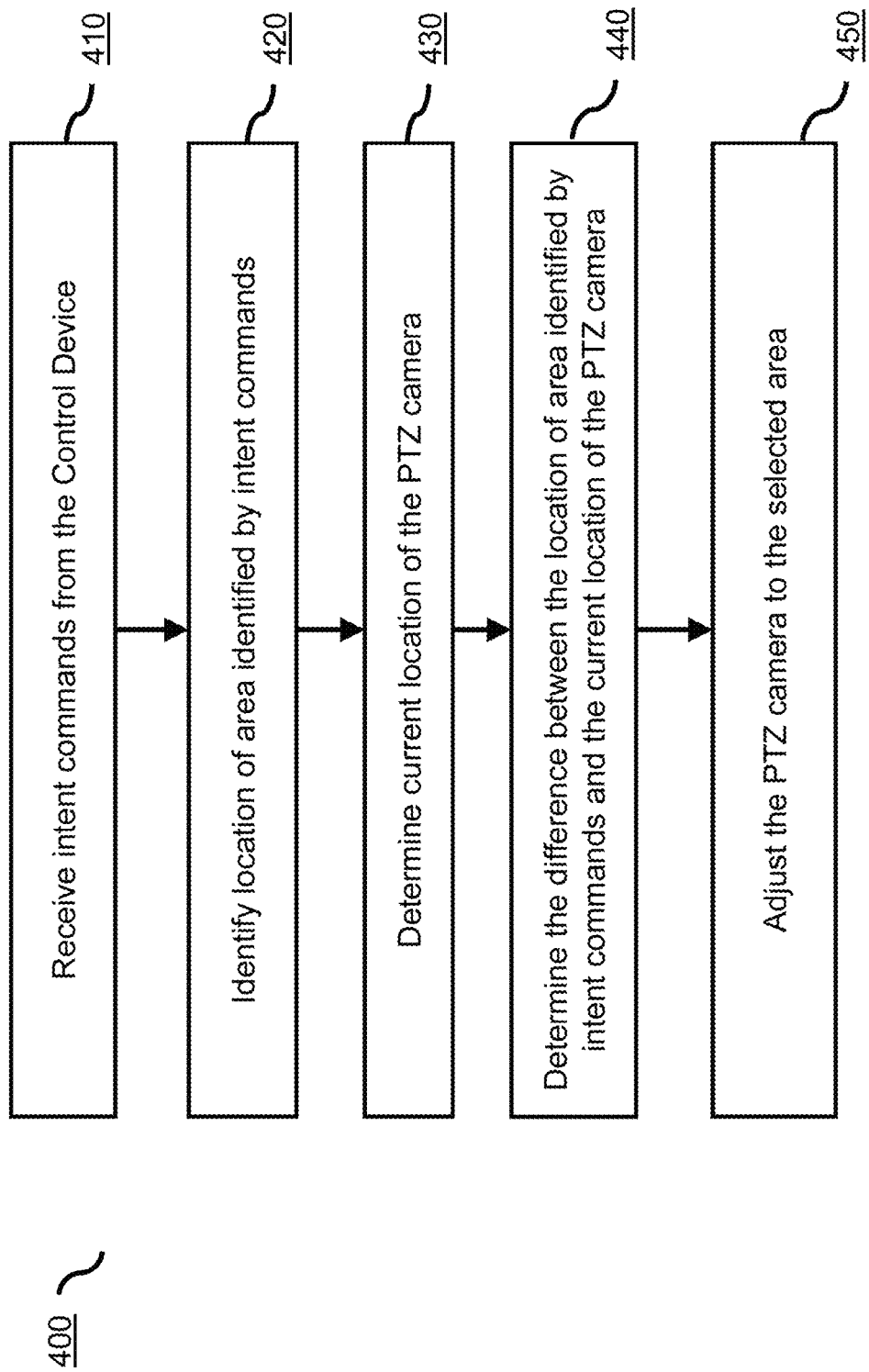
FIG. 4 is a flow chart illustrating a method of operating a camera from a computer interface of a control device, according to an embodiment.

FIG. 4 is a flow chart illustrating a method 400 of operating image-capture device 128 (shown in FIG. 1) from a computer interface of a control device 110, according to an embodiment. The method 400 includes receiving intent commands from the control device 110 and implementing the intent commands (e.g., adjusting the PTZ camera for obtaining an image of an object associated with the selected intent). The method can be implemented by a processor of a compute system (e.g., processor 122 of compute system 120). The method 400 is described with respect to the system 100, shown and described with respect to FIG. 1).

At 410, the method 400 involves, receiving at least one intent command from the control device 110. For example, with reference to FIGS. 1 and 2, the user 150*a* can select a portion of the 360 degree image containing the users (150*b* and 150*c*). In some instances, the user 150*a* can select at least some region to be enlarged from at least one of the portions of the screen (222, 224) e.g., from the 360 degree view. The processor 112 is configured to send intent commands from the control device 110 to the processor 122 of the compute system 120 via the communication network 130. In other instances, the user 150*a* can select from different options displayed on the user interface, for example, view vital parameter information, follow person, find patient, monitor/observe/track patient movements, etc. The processor 112 communicates to the compute system 120 the intent commands including the details of the intent.

At 420, the method 400 involves identifying a location of the area (e.g., a first portion of the 360 degree image) identified by the intent commands. The processor 122 can search for the object and/or scene (selected area) in the 360 degree image (for example, the image dimensions are $W_1 \times H_1$, where $W_1$ is width of the image and $H_1$ is the height of the image) using video analytics such as, for example, a machine learning model, as described above. In some instances, the processor 122 can determine a center point of the images captured by each fish-eye lens camera (for example, the center-point of the image can have coordinate ($W_1/2$, $H_1/2$)) and can use this as a reference to determine the coordinates for the location of the area identified by the intent commands.

At 430, the method 400 involves determining the current location of the PTZ camera. The processor 122 is configured to determine the current location of the PTZ camera by determining (and/or identifying) an object and/or scene in the image currently being captured by the PTZ camera. This can be done using the video analytics and/or machine learning model (as described above). The processor 122 is then configured to perform a search for the identified object and/or scene in the 360 degree surrounding image using the machine learning model, as described above. The processor 122 is further configured to determine the location (for example, X-coordinates/Y-coordinates and/or pixel data position of the object and/or scene) of the identified object and/or scene in the 360 degree surrounding image. Similarly stated, the processor 122 can identify a second portion of the 360 degree image based on the image that is currently being captured by the PTZ camera.

At 440, the method 400 involves determining and/or calculating the difference (or offset) between the location of area identified by intent commands and the current location of the PTZ camera. The processor 122 is configured to determine the difference by comparing the locations between the location of area identified by intent commands and the current location of the PTZ camera (for example, X-coordinates/Y-coordinates and/or pixel data positions of the objects and/or scenes) as determined in the above steps 420 and 430.

At 450, the method 400 involves adjusting the PTZ camera to the selected area. The processor 122 is configured to adjust (or send a signal to adjust) the PTZ camera to the location from the intent commands such that the PTZ camera captures the selected object and/or scene. The processor 122 can be configured to adjust the PTZ camera by panning, tilting and/or zooming the PTZ camera. In some instances, the processor can also move the PTZ camera in at least three degrees of freedom. The processor can be configured to perform operations such as panning, tilting and/or zooming for additional adjustments (e.g., based on user input at the control device 110). Such adjustments can be made based on the difference (or offset) between the location of area identified by intent commands and the current location of the PTZ camera. In some instances, the processor 122 can send the image captured by the adjusted PTZ camera to the control device (e.g., control device 110 of FIG. 1).

As discussed above and based on other intents provided by the user, the PTZ camera can be used to focus on an instrument panel for capturing an image of the data displayed by a medical measuring instrument. The medical measuring instruments can include but are not limited to electrocardiograph (ECG), pulse oximetry, blood-parameters monitoring (lipids, glucose, ketones and/or the like), urine analysis, spirometer, health scale & Body Mass Index (BMI) measuring instrument, defibrillator, and/or other medical instruments capable of measuring physiological parameters.

Moreover, as discussed above, in yet another instance, the compute system 120 can be trained to identify different medical measuring instruments using machine learning and image processing techniques such as object recognition. The machine learning model can be trained using a collection of images useful in identifying different medical instruments (e.g., based on a shape and/or feature of the medical instruments and/or based on a unique color marker and/or sticker included on the measuring instruments). For example, the user 150*a* can instruct the compute system 120 to show the information related to vital parameters of the patient. The compute system 120 can be configured to identify the medical measuring instrument associated with different vital parameters using the machine learning model for object recognition. The compute system 120 can then use the PTZ camera to capture an image of a medical measuring instrument and transmit the image to the control device 110.

FIG. 5*a* is a front view of a compute system 500 and FIG. 5*b* is a side view of the compute system 500, according to an embodiment. The compute system 500 includes two wide angle lens cameras 510*a* and 510*b* (for example, fish-eye lens cameras) and PTZ camera 512. The compute system 500 includes a control panel 530 and a keyboard 536 as input devices. In other instances, the compute system 500 can include a camera, a touchpad, a touchscreen and/or the like as other input devices. The wide angel lens cameras 510*a* and 510*b* as well as the PTZ camera 512 can be similar to the cameras shown and described above.

The compute system 500 includes a primary display screen 520 and an optional secondary display screen 522.

The primary display screen 520 and the secondary display screen 522 displays at least some output from the processor 122. In some instances, the compute system 500 can include at least one acoustic speaker for providing audio capabilities.

The control panel 530 includes controls (e.g., buttons or actuators) that can be used to control features of the compute system 500 (for example, the control panel can be used to operate the compute system 500 for selecting on-screen displayed options, calling control device 110, changing the position of camera and/or other features of the compute system 500). The compute system 500 can include a wireless communication device (for example, an integrated Wi-Fi modem) for establishing network connectivity. Moreover, the compute system 500 can also include connection cables 534 for wired network connectivity. The compute system 500 can include a battery (for example, Lithium Ion battery) and compatible power cables for charging in the compute system 500. The compute system 500 can include a storage cabinet/accessory compartment 540 and/or a computer cabinet 542 for housing the electronic components and/or other storage purposes.

The body structure of the compute system 500 includes a height extendable column 544 (for example, a telescopic cylinder). The height of the height extendable column 544 can be varied manually using a mechanical lever (and/or telescopic hydraulic cylinder). In some instances, the height of the height extendable structure 544 can be varied using electronic motor assembly 546. The system 500 includes an optional articulating arm 548 for adjusting the position of the secondary display screen 522.

The compute system 500 can be placed on a motor-operated locomotion mechanism 550. The motor-operated locomotion mechanism can include an arrangement of wheels, casters, ball bearing and/or the like.

In use, the system 500 captures images using PTZ camera 512 and 360 degree images using wide angle lens cameras 510a and 510b and transmits the images using the wireless communication device to the control device 110 (shown in FIG. 1). A user at the control device end can view the 360 degree surrounding image and the PTZ camera image. The user can select from different options displayed by the user interface image to implement different actions on the compute system 500, as described above. The user can perform actions, for example, panning, tilting and/or zooming to adjust the image of the PTZ camera 512. The user can instruct the compute system 500 to execute an intent (e.g., such as locate a person, obtain reading from the different medical instruments, follow (and/or monitor) patient movements and/or other intents as described above). In some instances, the user can change the position of the compute system 500 by controlling the motor-operated locomotion mechanism 550.

Figure 6B:
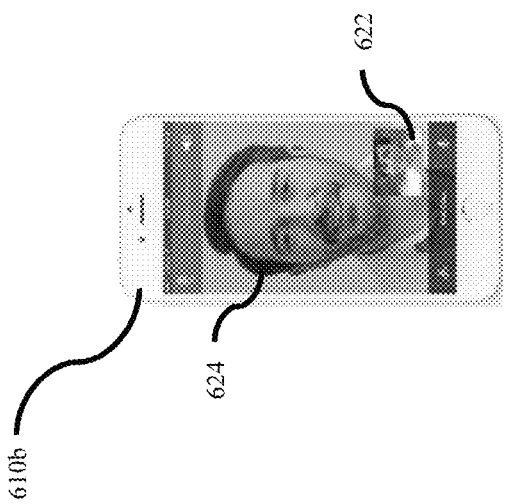
FIGS. 6a and 6b are examples of a multimedia device interface, according to embodiments.
Figure 6A:
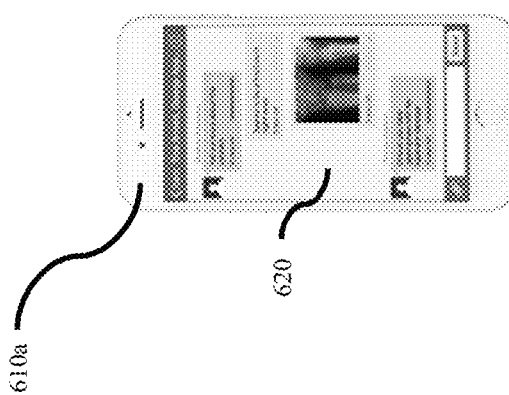

FIG. 6a and FIG. 6b are examples of a multimedia device interface, according to an embodiment. FIG. 6a and FIG. 6b illustrate an example of a user interface being displayed on the multimedia devices 610a and 610b (for example a smartphone, tablet, laptop and/or the like) being implemented as a control device 110. The user interface being displayed on the multimedia devices 610a and 610b can involve text and/or pictorial based communication.

FIG. 6a illustrates an example of a user interface displaying textual-based communication on a multimedia device 610a implemented as the control device 110. For example, in medical application, a healthcare professional can read (and/or access) different textual information on his/her multimedia smartphone sent from compute system 120 through a communication network.

FIG. 6b illustrates an example of the user interface involving video-based communication on a multimedia device 610b implemented as the control device 110. FIG. 6b illustrates the user interface representing of an image of a user 622 operating the multimedia device 610b. The user interface can further represent an image of another user 624 operating compute system 120. Both the users can be connected through the communication network. For example, in medical application, a remotely located healthcare professional can view a patient using his/her smartphone. In some instances, the video can be from a system allowing remote camera control, such as those described herein. As such, the user can provide instructions to the multimedia device 610b to execute intents, as described above.

In use, the multimedia devices 610a and 610b can be used by a remote user 622 to exchange text message(s), view image(s)/video(s), listen audio(s), view X-ray(s), access vital parameter(s), access other medical report and/or the like. While as illustrated in FIG. 6b, the multimedia device 610b can be used to establish video-based communication with the compute system 120.

In some instances, the user can switch between textual-based communication and video-based communication. The switching between textual-based communication and video-based communication can be implemented without communication being disrupted and/or disconnected. The switching between textual-based communication and video-based communication can involve switching between two windows (and/or tab), one displaying a textual-based communication and another displaying video-based communication. The two windows (and/or tabs) can be displayed simultaneously. In some other instances, the user can view textual-based communication as an overlay (and/or filter) on the video-based communication.

In other instances, the control device 110 can be device-independent and can be implemented using any suitable hardware device supported by suitable software package and connected to the communication network.

While various embodiments have been described above, it should be understood that they have been presented by way of example only, and not limitation. Where methods and/or schematics described above indicate certain events and/or flow patterns occurring in certain order, the ordering of certain events and/or flow patterns may be modified. While the embodiments have been particularly shown and described, it will be understood that various changes in form and details may be made.

While shown and described above as the intent commands being processed at the processor of a compute system (e.g., compute system 120 of FIG. 1) collocated with the image-capture devices (e.g., image capture device 128 of FIG. 1), in other implementations the intent commands can be processed (e.g., executing the machine learning model to identify objects and/or scenes to be displayed by the PTZ camera) at any other suitable device. For example, the intent commands can be executed and/or processed by a control device (e.g., control device 110) and/or by a server operatively coupled to the control device and the compute system. In such implementations, commands to move and/or reposition the PTZ camera can be sent from the control device and/or server as a result of the execution and/or processing of the intent commands.

As described above, the processor 122 can be configured to implement machine learning models to identify object(s) in the 360 degree surrounding image. The machine learning model(s) implemented by the processor 122 can be based on supervised learning, unsupervised learning, reinforcement learning and/or combination of at least two machine learning models. The machine learning models can include processes and/or algorithm(s) such as, for example, linear regression, logistic regression, decision tree, support vector machine (SVM), Naïve Bayes, K-nearest neighbors (KNN), K-means, random forest, dimensionality reduction, gradient boost and adaboost and/or the other machine learning algorithm(s).

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™, Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

What is claimed is:

1. An apparatus, comprising:
a memory; and
a processor operatively coupled to the memory, the processor configured to receive an intent command from a control device operatively coupled to the processor via a network, the processor configured to identify, based on the intent command, a first portion of an image captured by a first image capture device, with the image including one or more objects,
wherein the control device presents a user interface with:
the image captured by the first image capture device; and
controls for selection of different options and for selection of an object of the one or more objects in the image captured by the first image capture device,
wherein an option that is selected indicates that the selected object is tracked by a second image capture device;
wherein a position of the first image capture device is changeable with respect to a position of the second image capture device;
wherein the intent command from the control device comprises data representing selection of the option and the object, wherein the first portion includes the selected object;
the processor configured to identify, using video analytics, a second portion of the image captured by the first image capture device, the second portion included in an image captured by a second image capture device at a first time, wherein identifying comprises:
extracting one or more features in the image captured by the second image capture device;
searching the image captured by the first image capture device to find the one or more features in the image captured by the second image capture device for locating the one or more features in the image captured by the first image capture device;
identifying the second portion of the image captured by the first image capture device that includes the one or more features; and
determining a difference between (i) the second portion of the image captured by the first image capture device, and (ii) the first portion identified based on the intent command that comprises data representing selection of the option and the object presented in the user interface;
the processor configured to calculate an offset between the first portion identified based on the intent command that comprises data representing selection of the option and the object presented in the user interface and the second portion using the image captured by the first image capture device,
the processor configured to send a signal to adjust, using the offset, the second image capture device to capture an image including the first portion with the selected object at a second time after the first time.

2. The apparatus of claim 1, wherein the first image capture device is at least one wide-angle lens camera and the second image capture device is a pan-tilt-zoom (PTZ) camera.

3. The apparatus of claim 1, wherein the processor is configured to send the image captured by the second image capture device at the second time and including the first portion to the control device.

4. The apparatus of claim 1, wherein the processor is configured to facilitate video conferencing with the control device.

5. The apparatus of claim 1, wherein the intent command is associated with a user of the control device selecting to view with the second image capture device the first portion of the image captured by the first image capture device.

6. The apparatus of claim 1, wherein the intent command is associated with a user of the control device selecting to view with the second image capture device an object within the image captured by the first image capture device.

7. The apparatus of claim 1, wherein the processor is configured to identify the second portion of the image captured by the first image capture device by matching the image captured by the second image capture device at the first time to the second portion within the image captured by the first image capture device using a machine learning model, the machine learning model configured to:
- extract the one or more features from the image captured by the first image capture device; and
- identify relationships among the one or more features.

8. The apparatus of claim 1, wherein the intent command from the control device comprises data representing a selection of a region on a user interface of the control device,
- the region representing the first portion of the image captured by the first image capture device.

9. The apparatus of claim 1, wherein the image captured by the first image capture device represents a 360 degree view of an environment.

10. The apparatus of claim 9, wherein the second image capture device is configured for 360 degree rotation to enable the second image capture device to view any portion of the image captured by the first image capture device.

11. The apparatus of claim 10, wherein the first image capture device and the second image capture device have an axis of alignment, and wherein the 360 degree rotation of the second image capture device is around the axis of alignment.

12. The apparatus of claim 1, wherein the intent command specifies that identified motion of a given object results in the given object being the tracked object.

13. The apparatus of claim 1, wherein the intent command specifies a type of the object, and wherein the one or more features correspond to the type of the object.

* * * * *